J. H. Post,
Joining Machine.

No. 36,025.        Patented July 29, 1862.

Witnesses:
S. N. Burnham
Thos. D. Horn

Inventor:
John H. Post

UNITED STATES PATENT OFFICE.

JOHN H. POST, OF PATERSON, NEW JERSEY.

IMPROVED SAWING, BORING, MOLDING, AND PLANING MACHINE.

Specification forming part of Letters Patent No. 36,025, dated July 29, 1862.

*To all whom it may concern:*

Be it known that I, JOHN H. POST, of Paterson, in the county of Passaic and State of New Jersey, have invented a new and Improved Combination of a Sawing, Boring, Planing, and Molding Machine, the construction and operation of which I have described in the following specification and illustrated in its accompanying drawings with sufficient clearness to enable competent and skillful workmen in the arts to which it pertains or is most nearly allied to make and use my invention.

My said invention consists in the combination, in the manner hereinafter described, of the right and left hand screws and nuts on the shaft with the cutter-head in such a manner that the resistance against the cutter-head of the lumber in the operation of cutting shall have the effect to tighten both the nuts against the cutter-head, thus holding it in position beyond the contingency of becoming loose or the necessity of jam-nuts to keep it in place, the whole being constructed and arranged, as hereinafter more fully set forth, for the adjustment of the cutter-head to any desired position longitudinally upon its axis.

Figure 1:
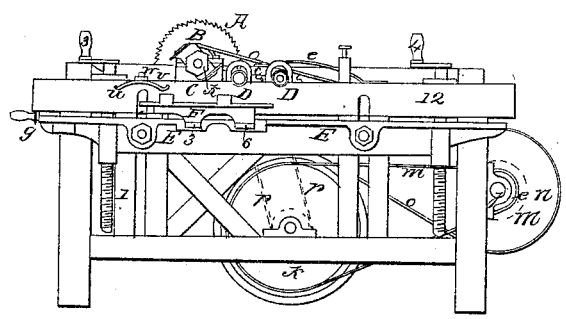
Figure 2:
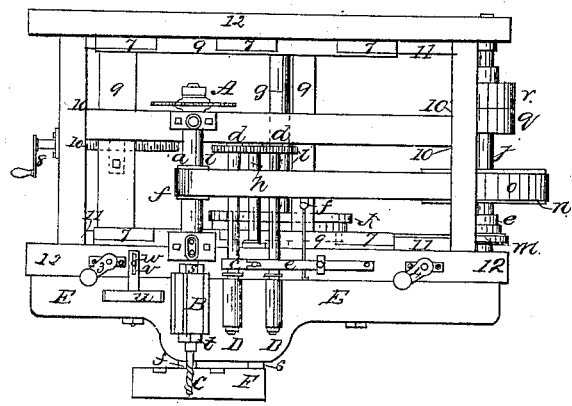

In the accompanying drawings, Figure 1 is a side elevation of my machine. Fig. 2 is a plan.

A is the saw, B the planer and molder, C the auger, and $a$ the mandrel or shaft on which these turn. $f$ is the pulley or drum which drives it.

D D are the feed-rollers, with boxes at the ends $d\ d$, which vibrate so as to allow the rollers to rise, and thus admit a larger piece of wood to pass under them. At the other ends of these feed-rollers the cap $c$ is placed, and held down to the proper position by the spring $e$, which allows the cap to rise, and with it the rollers, whenever the thickness of the piece of material which is being worked renders it necessary. When these rollers are not in use, they may be thrown out of connection by means of a clutch on the shaft $g$. The lever by which this clutch is operated is shown at $f'$. The motion is transmitted from the shaft $g$ to the shaft $h$ by means of a belt, (shown by dotted lines $p\ p$ in Fig. 1,) and from the shaft $h$ to the rollers by the cogged gearing $i\ i$. Motion is communicated from the driving-shaft $j$ to the intermediate $g$ by means of the pulleys $k$ and $l$ and the belt $m$, and also to the mandrel $a$ through the pulleys $p$ and $n$ and the belt $o$.

$q$ is the driving-pulley, and $r$ a loose pulley which is used when it is desired to stop the whole machine.

The cutter B is so arranged on the mandrel $a$ (by means of the nuts $s\ t$) that it may be moved out or in, varying the width of the cut and the form of molding which it makes.

$u$ is a spring which bears upon the end of the piece of material which has been operated upon, holding it down to the table or bed E. This spring may be adjusted to different widths of stuff by the slot $v$ and the set-screw $w$. The table E may be raised or lowered to adapt it to different kinds of work by the screws 1 and 2, operated by the cranks 3 and 4.

The boring part of the machine is placed outside of the planer upon the end of the mandrel $a$, the auger C screwing into the mandrel. The table or gage F of this apparatus is connected with the bed E of the planer B by the slides 5 and 6, which work in grooves which are made in the table E for that purpose. This gage is adjustable by means of the slides 5 and 6 and the screws 1 and 2, which adjust the bed E. The table of the saw is placed upon the inclined planes 7 7 7 7 7, having similar inclined planes which coincide in position with the planes 7 7 and are inclined the opposite way. By this arrangement, when the crank 8 is turned, moving the frame 9 (which supports the inclined planes 7 7) back and forth, the table is forced up or let down, to suit the convenience of the operator. The table is prevented from moving laterally by stops secured to it, which work against the frame of the machine at the points 10 10, sliding up and down with the table, to which they are attached. The frame 9 is supported by ways 11 11, which are secured to the timbers 12 12 of the machine-frame.

Having thus fully described my invention, I claim as original and desire to secure by Letters Patent—

The combination, with the mandrel or shaft upon which the cutter-head is hung, and with the cutter-head, of the right and left hand screw-threads and corresponding nuts, by which the cutter-head may be adjusted to the proper position on the shaft, and also held in position by the screws and nuts, the parts being so constructed and arranged that the resistance of the material will have a tendency to decrease the distance between them by means of the friction of the cutter-head upon them, and thus secure the cutter-head more firmly in position, and also thereby avoiding the necessity of jam-nuts or other appliances to secure the nuts which hold the cutter-head in adjustment from displacement, substantially as set forth.

JOHN H. POST.

Witnesses:
SAMUEL A. ROMAIN,
JOSEPH GOETSCHIUS.